(12) United States Patent
Greywall

(10) Patent No.: US 6,667,823 B2
(45) Date of Patent: Dec. 23, 2003

(54) MONOLITHIC IN-PLANE SHUTTER SWITCH

(75) Inventor: Dennis S. Greywall, Whitehouse Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/153,294

(22) Filed: May 22, 2002

(65) Prior Publication Data

US 2003/0218789 A1 Nov. 27, 2003

(51) Int. Cl.[7] ............................................... G02B 26/08
(52) U.S. Cl. ....................... 359/224; 359/223; 359/198
(58) Field of Search ................................ 359/295, 290, 359/230, 223, 224, 214, 212, 198; 310/309.12; 385/18

(56) References Cited

U.S. PATENT DOCUMENTS

| | | | |
|---|---|---|---|
| 5,062,689 A | * 11/1991 | Koehler | ....................... 359/230 |
| 5,501,893 A | 3/1996 | Laermer et al. | |
| 5,629,790 A | 5/1997 | Neukermans et al. | |
| 5,745,281 A | * 4/1998 | Yi et al. | ..................... 359/290 |
| 6,201,631 B1 | 3/2001 | Greywall | |
| 6,220,561 B1 | * 4/2001 | Garcia | ........................ 310/309 |
| 6,229,640 B1 | * 5/2001 | Zhang | ........................ 359/290 |
| 6,404,969 B1 | * 6/2002 | Tayebati et al. | ............ 385/140 |
| 2002/0005976 A1 | * 1/2002 | Behin et al. | ................ 359/254 |

* cited by examiner

Primary Examiner—Hung Xuan Dang
Assistant Examiner—Tuyen Tra

(57) ABSTRACT

A shutter switch that may be fabricated using a single wafer, which alleviates the alignment problem associated with a two-piece prior art design. The switch has a movable mirror that is designed for in-plane motion. The mirror is connected to a drive shaft that can be moved, e.g., using one or more serpentine springs and a comb drive actuator. During operation, the mirror is in either one of two terminal positions. The mirror moves between the terminal positions in response to a voltage applied to the actuator. The springs and actuator are designed such that small voltage variations around the voltage values corresponding to the terminal positions do not substantially displace the mirror from those positions. As a result, any electrostatic charge accumulation will not result in significant drifting of the mirror. Multiple shutter switches may be arrayed in a single integrated structure.

21 Claims, 6 Drawing Sheets

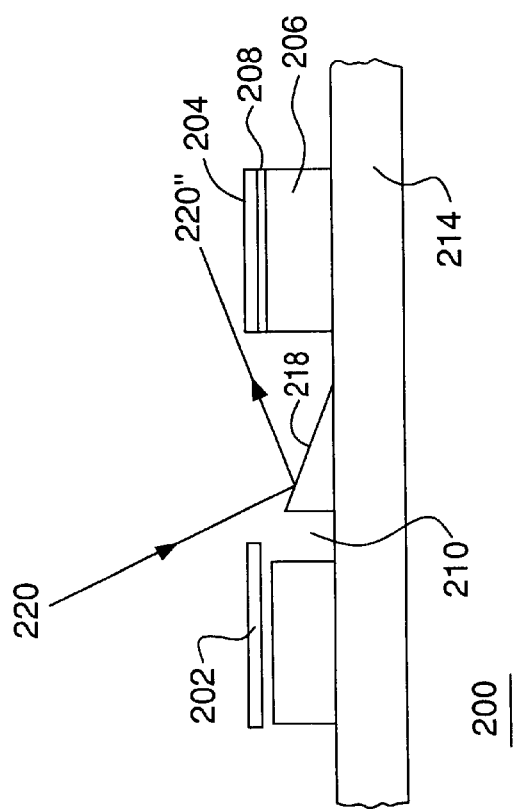
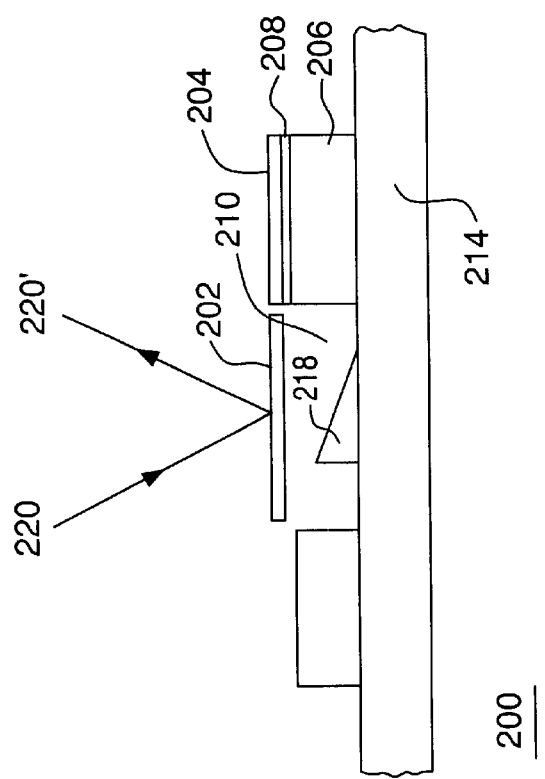

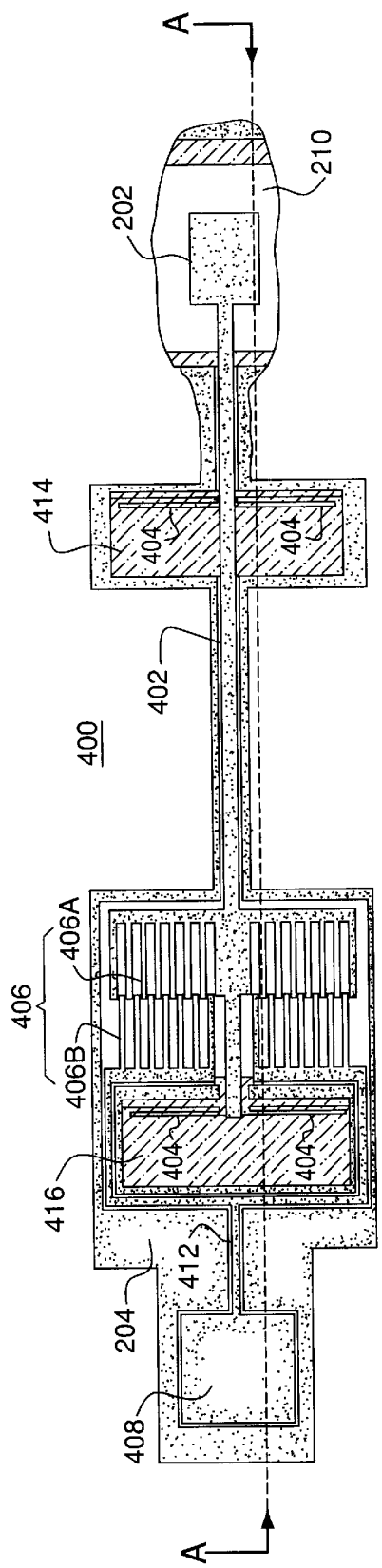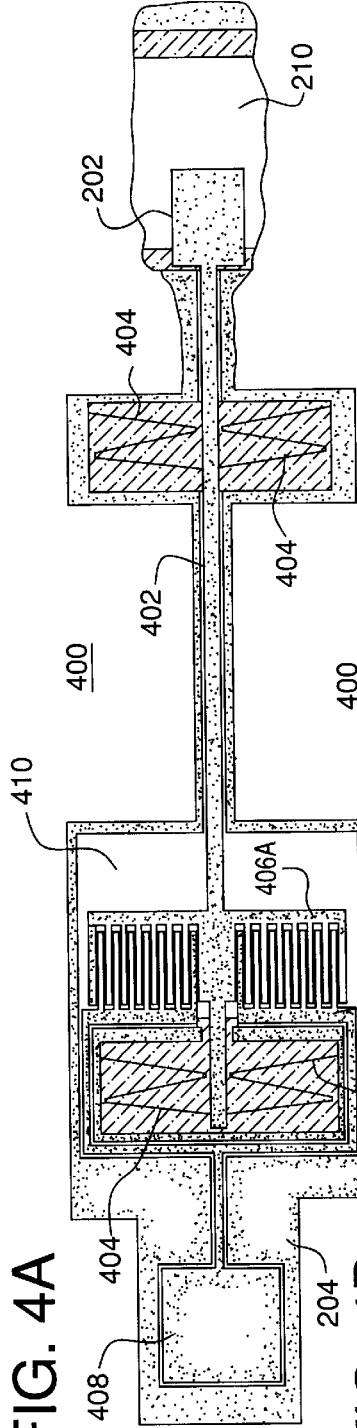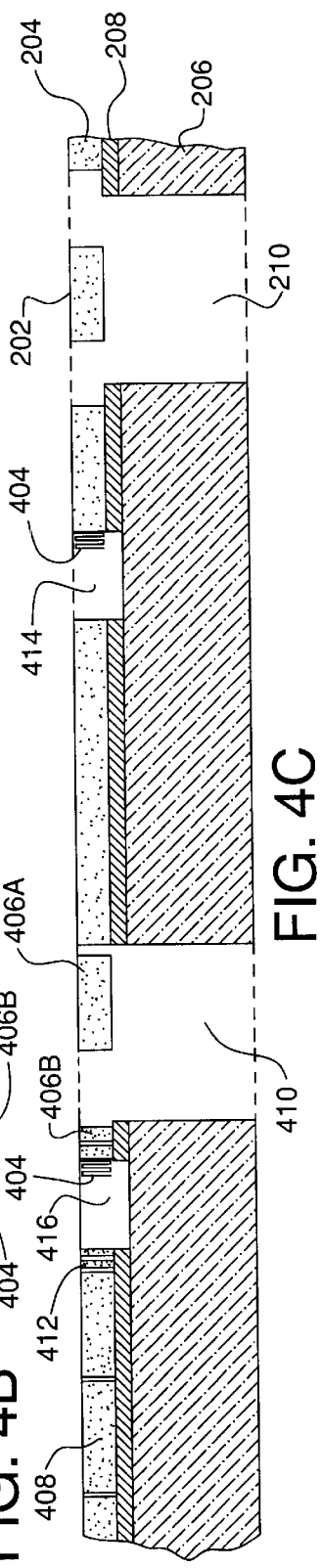
FIG. 4A
FIG. 4B
FIG. 4C

MONOLITHIC IN-PLANE SHUTTER SWITCH

CROSS REFERENCE TO RELATED APPLICATIONS

The subject matter of this application is related to that of U.S. patent application Ser. No. 09/874,338, filed Jun. 5, 2001, and entitled "Article Comprising a Reflection-Type Spectral Equalizer/Optical Switch," the teachings of which are incorporated herein by reference.

BACKGROUND OF THE INVENTION

1. Field of the Invention

The present invention relates to optical communication equipment and, more specifically, to micro-electromechanical devices for use in such equipment.

2. Description of the Related Art

Optical communication equipment often employ micro-electromechanical systems (MEMS). A typical MEMS system may include an array of micro-machined mirrors, each mirror individually movable in response to an electrical signal. Such an array may be configured, e.g., as an optical cross-connect element. In operation, each mirror in the array receives a beam of light, for example, from an input optical fiber. The beam is reflected from the mirror and can be redirected to a different location, e.g., an output optical fiber, by rotating the mirror. More details on the principle of operation and methods of manufacture of MEMS devices including mirror arrays may be found, for example, in commonly assigned U.S. Pat. No. 6,201,631, the teachings of which are incorporated herein by reference.

One problem with prior art MEMS devices is related to electrostatic charge accumulation around defects, e.g., residual oxide, on the substrate layer and/or wafer. Electrostatic potentials generated by the accumulated charge may interfere with those generated by the actuating electrodes and therefore may affect the angle of rotation of the mirror. In addition, the amount of accumulated charge may change over time causing angle "drifting." Therefore, the performance of the device may be adversely affected.

An additional problem is related to manufacturing such devices. During fabrication, two pieces, e.g., wafers, forming the MEMS device need to be accurately aligned to properly position the electrodes with respect to the corresponding mirror. Such alignment may be difficult to achieve for relatively small mirrors and/or mirror arrays having a relatively large number of mirrors.

SUMMARY OF THE INVENTION

The present invention provides a shutter switch that may be fabricated using a single wafer, which alleviates the alignment problem associated with a two-piece prior art design. The switch has a movable mirror that is designed for in-plane motion. The mirror is connected to a drive shaft that can be moved, e.g., using one or more serpentine springs and a comb drive actuator. During operation, the mirror is in either one of two terminal positions. The mirror moves between the terminal positions in response to a voltage applied to the actuator. The springs and actuator are designed such that small voltage variations around the voltage values corresponding to the terminal positions do not substantially displace the mirror from those positions. As a result, any electrostatic charge accumulation will not result in significant drifting of the mirror. Multiple shutter switches may be arrayed in a single integrated structure.

According to one embodiment, the present invention is a shutter switch. The shutter switch has a stationary part, a movable part, and one or more springs connected between the stationary part and the movable part. The stationary part has a substrate and an immobile portion of an actuator rigidly connected to the substrate. The movable part is supported on the substrate and has a mirror, a shaft rigidly connected to the mirror, and a mobile portion of the actuator rigidly connected to the shaft. The actuator is configured to move the movable part relative to the stationary part in response to an electrical signal such that motion of the movable part generates mirror motion parallel to the plane of the substrate.

According to another embodiment, the present invention is a method of fabricating a movable structure supported on a substrate in an integrated device. The integrated device is formed in a wafer having at least three layers, wherein a second layer is formed over a first layer and a third layer is formed over the second layer. The first layer includes the substrate. According to the method, a first etching step is applied to form one or more openings in the third layer to expose portions of the second layer. A second etching step is applied to remove material from the second layer to detach the movable structure, wherein the movable structure is formed in the third layer and configured to move parallel to the plane of the wafer.

BRIEF DESCRIPTION OF THE DRAWINGS

FIGS. 2A–B illustrate a cross-sectional view of a shutter switch according to one embodiment of the present invention;

FIGS. 4A–C show top and cross-sectional views of a shutter switch according to yet another embodiment of the present invention;

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1B:
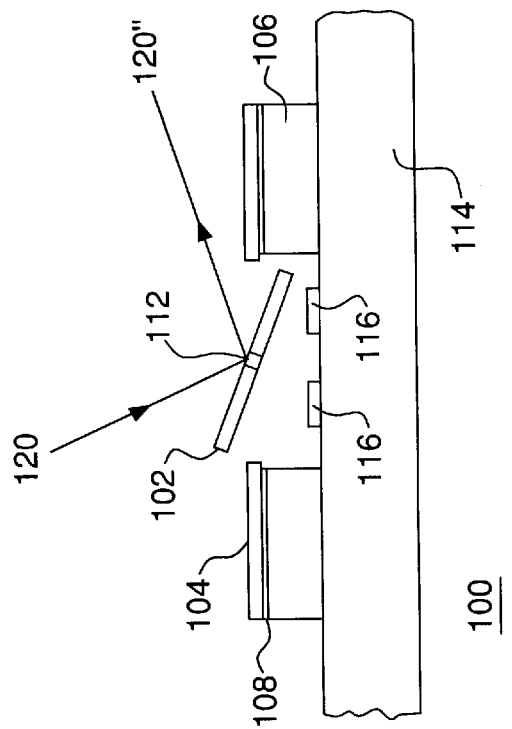
FIGS. 1A–B illustrate a cross-sectional view of a representative prior art MEMS device.
Figure 1A:
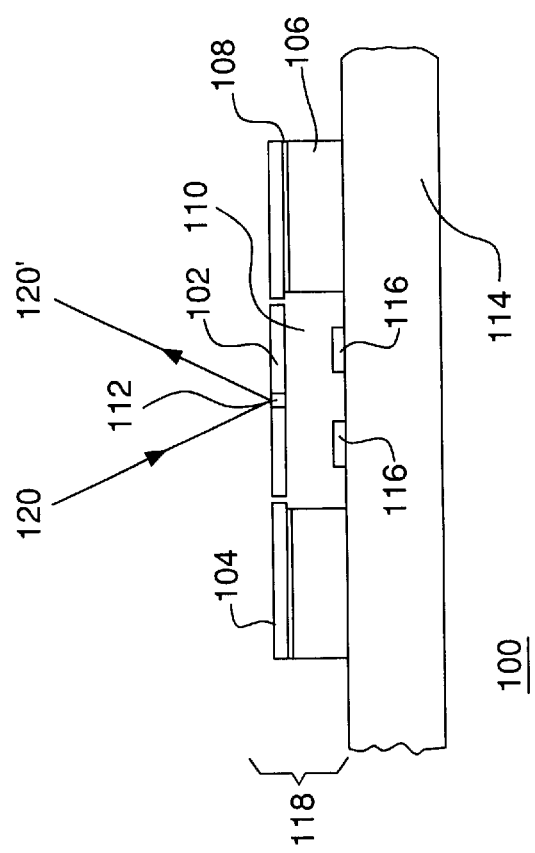

FIG. 1A shows a cross-sectional view of a representative MEMS device 100 of the prior art that may be used in an optical cross-connect element or an add/drop element. Device 100 comprises a movable mirror 102 formed in an overlayer 104 of a wafer 118 using, e.g., reactive etching. Wafer 118 has two additional layers: a substrate layer 106 and a thin insulating layer 108. Layer 108 electrically isolates overlayer 104 from substrate layer 106. Overlayer 104 and substrate layer 106 may be silicon and insulating layer 108 may be silicon oxide. Mirror 102 is supported above a cavity 110 by a pair of torsional members 112 connected to overlayer 104. Cavity 110 is defined in insulating layer 108 and substrate layer 106. A second wafer 114 includes electrodes 116 as well as electrical interconnections (not shown). Substrate layer 106 is attached to wafer 114 such that electrodes 116 are located beneath mirror 102 in cavity 110.

FIG. 1B illustrates how a beam of light 120 impinging on mirror 102 can be redirected from direction 120' (FIG. 1A) to direction 120" using mirror rotation. Mirror 102 rotates about the axis defined by torsional members 112 in response to voltages applied to electrodes 116. Changing those voltages can change the angle of rotation thus enabling a cross-connecting function of device 100.

FIGS. 2A–B show cross-sectional views of a shutter switch 200 configured as a 1×2 switch according to one embodiment of the present invention. Similar to device 100 of FIG. 1, switch 200 has a movable mirror 202 formed in an overlayer 204. However, in contrast to device 100 having mirror 102 movable out of plane (e.g., the plane of overlayer 104), mirror 202 of switch 200 is designed to move within the plane of overlayer 204. In one implementation, mirror 202 is configured to move between two terminal positions, e.g., a right-side position shown in FIG. 2A and a left-side position shown in FIG. 2B. Portions of overlayer 204 corresponding to the in-plane trajectory of mirror 202 between those terminal positions are removed (e.g., by reactive etching) to permit such motion.

Referring to FIG. 2A, mirror 202 may be supported above a cavity 210 by a drive shaft (not shown), the shaft connected to overlayer 204 by, e.g., one or more serpentine springs (also not shown). Cavity 210 is defined in a first substrate layer 206 that supports overlayer 204. Substrate layer 206 is electrically isolated from overlayer 204 by a thin insulating layer 208. A fixed tilted reflector 218 is configured on a second substrate layer 214. Substrate layers 206 and 214 are attached together such that reflector 218 is positioned in cavity 210. Reflector 218 may be made of any suitable material, such as, for example, epi-silicon or silicon oxide covered by an aluminum reflective coating.

FIGS. 2A–B illustrate how a beam of light 220 can be redirected using in-plane mirror translation in switch 200. When mirror 202 is in the right-side terminal position shown in FIG. 2A, it blocks beam 220 from reaching reflector 218. Consequently, beam 220 is reflected from mirror 202 in direction 220'. Alternatively, when mirror 202 is translated to the left-side terminal position shown in FIG. 2B, reflector 218 becomes exposed and beam 220 is reflected in direction 220". Therefore, by moving mirror 202 between the two terminal positions, beam 220 can be redirected, e.g., from direction 220' to direction 220", thus enabling a 1×2 switching operation of switch 200.

Figure 3B:
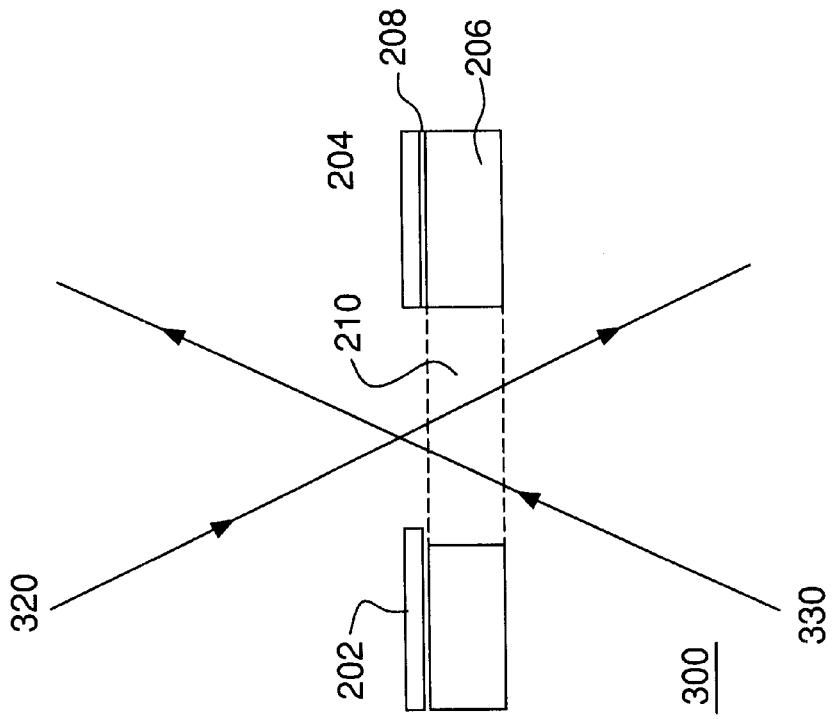
FIGS. 3A–B illustrate a cross-sectional view of a shutter switch according to another embodiment of the present invention.
Figure 3A:
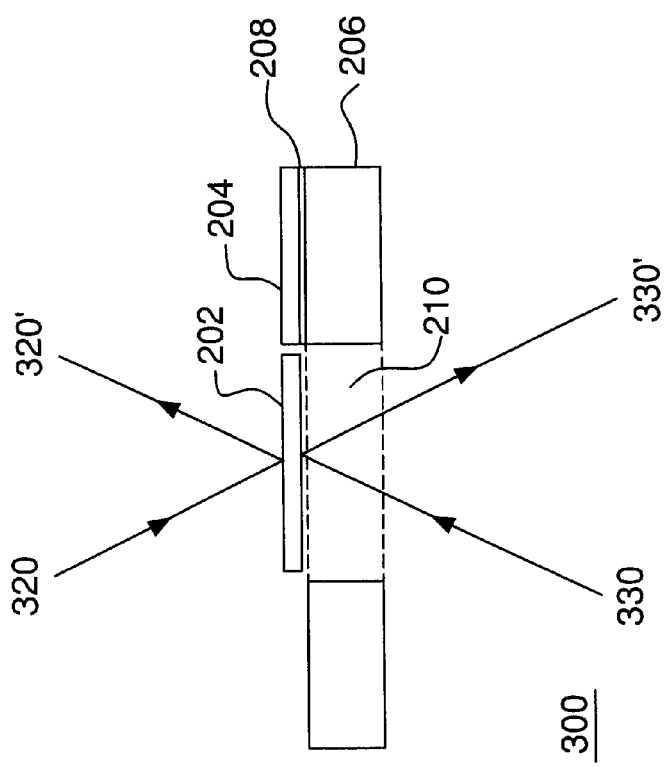

FIGS. 3A–B show cross-sectional views of a shutter switch 300 configured as an add/drop element according to another embodiment of the present invention. Switch 300 is similar to switch 200 of FIG. 2, except that switch 300 does not have second substrate layer 214 and fixed reflector 218.

In one embodiment, switch 300 may operate as follows. When mirror 202 of switch 300 is in the right-side terminal position as shown in FIG. 3A, both sides of the mirror are accessible to light. For example, a first beam of light 320 may impinge on an upper surface of mirror 202, e.g., from a first input optical fiber, and be reflected from it, e.g., in direction 320' corresponding to a first output optical fiber. Similarly (and simultaneously), a second beam of light 330 may impinge on a lower surface of mirror 202, e.g., from a second input optical fiber, and be reflected from it, e.g., in direction 330' corresponding to a second output optical fiber. When mirror 202 of switch 300 is translated into the left-side terminal position as shown in FIG. 3B, beams 320 and 330 propagate freely through cavity 210 and may be coupled directly into the second and first output fibers, respectively. Therefore, by moving mirror 202, e.g., from the right-side position to the left-side position, an optical signal corresponding to beam 320 is dropped from the first output optical fiber whereas an optical signal corresponding to beam 330 is added thereto. At the same time, the optical signal corresponding to beam 320/330 is added to/dropped from the second output optical fiber.

Since switches 200 and 300 operate using mirror 202 as a shutter having two states (open and closed), those switches may be less susceptible to possible electrostatic charge accumulation than, e.g., device 100 of FIG. 1. This, therefore, reduces, for example, the "drifting" problem. In addition, switch 300 can be monolithic, i.e., fabricated using a single wafer, for example, a silicon-on-insulator (SOI) wafer. Therefore, switch 300 alleviates the alignment problem during switch fabrication.

FIGS. 4A–C show top and cross-sectional views of a shutter switch 400 according to yet another embodiment of the present invention. More specifically, FIGS. 4A–B show top views of switch 400 corresponding to two different terminal positions of its movable mirror. FIG. 4C shows a cross-sectional view of switch 400 along the plane designated AA in FIG. 4A.

Referring now to FIGS. 4A and 4C, switch 400 comprises mirror 202 supported above cavity 210 by a drive shaft 402, the shaft connected to overlayer 204 by four serpentine springs 404. In different embodiments, a different number of springs may be used. Mirror 202 may have a reflective metal coating (not shown) deposited on one or both sides as known in the art. Switch 400 further comprises a comb drive actuator 406 including (i) a mobile portion 406A connected to shaft 402 and (ii) an immobile portion 406B attached to layer 208 and supported above cavity 410. Shaft 402 and portion 406A of actuator 406 are detached from the underlying layers 206 and 208 to permit in-plane motion of the shaft and mirror 202. Cavities 414 and 416 are formed in overlayer 204 and insulating layer 208 to accommodate the expansion of springs 404 during that motion.

Portion 406B of actuator 406 is electrically connected to a contact pad 408 using a contact track 412. Portion 406B of actuator 406, track 412, and pad 408 are electrically isolated from the rest of the switch structure using the underlying insulation of layer 208 and the surrounding grooves in overlayer 204. In contrast, portion 406A of actuator 406 is in electrical contact with overlayer 204 via shaft 402 and springs 404. Thus, a voltage differential can be applied between portions 406A–B of actuator 406. In one configuration, layers 204 and 206 may be connected to a negative terminal of a voltage source (e.g., ground), whereas pad 408 may be connected to a positive terminal of that voltage source configured to apply voltage between portions 406A–B of actuator 406. Contact pad 408 may be metal-plated as known in the art for better ohmic contact with a wire lead (not shown).

Referring now to FIGS. 4A and 4B, switch 400 may be operated as follows. When no voltage is applied between portions 406A–B of actuator 406, springs 404 are in a contracted state thus holding mirror 202 in a right-side terminal position as shown in FIG. 4A. When voltage is applied between those portions of actuator 406, e.g., as explained above, it exerts an attractive force between the portions causing mobile portion 406A to move toward immobile portion 406B. As a result, mirror 202 moves to the left-side terminal position as shown in FIG. 4B. In that position, springs 404 are expanded into corresponding cavities 414 and 416. When the voltage is removed, the contracting force of springs 404 will return portions 406A–B of actuator 406, shaft 402, and mirror 202 back to the positions shown in FIG. 4A.

Figure 5:
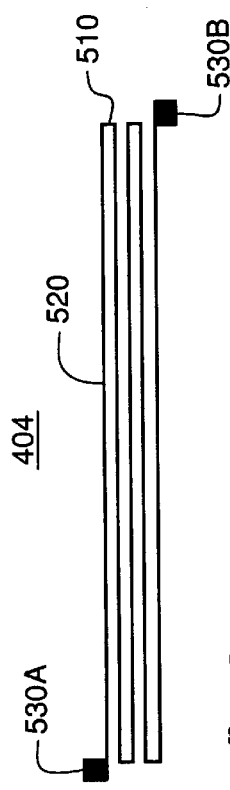
FIG. 5 shows a schematic diagram of a serpentine spring that may be used in the shutter switch of FIG. 4 according to one embodiment of the present invention.

FIG. 5 shows an enlarged view of serpentine spring 404 having five spring segments according to one embodiment of the present invention. Spring 404 comprises four relatively short members 510 and five relatively long members 520. Spring 404 is attached to overlayer 204 and shaft 402 at termini 530A–B.

Figure 6:
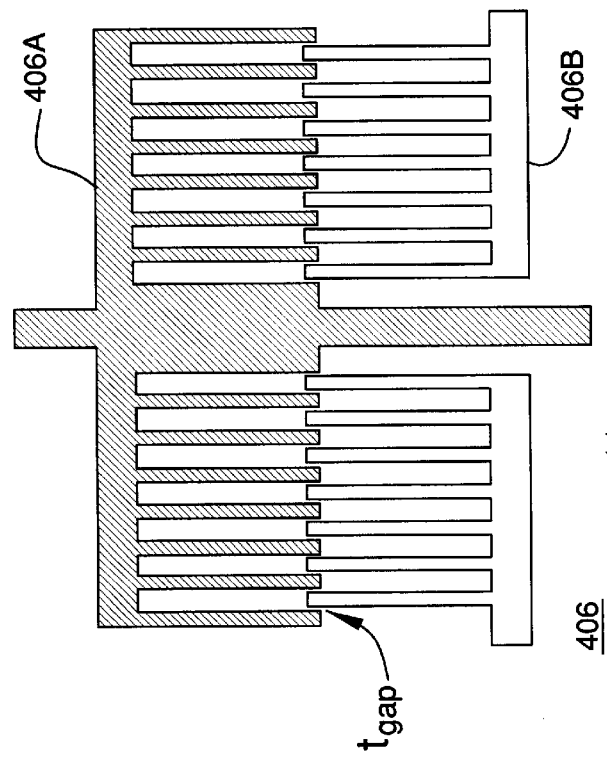
FIG. 6 shows a schematic diagram of a comb drive actuator that may be used in the shutter switch of FIG. 4 according to one embodiment of the present invention.

FIG. 6 shows an enlarged view of comb drive actuator 406 having fourteen teeth in each portion according to one embodiment of the present invention. Assuming that actuator 406 of the type shown in FIG. 6 is used in a shutter switch with one or more springs 404 of the type shown in FIG. 5, a voltage-displacement relation is given by Equation (1) as follows:

$$V^2 = 1.48 \times 10^{10} \frac{n_s t_{gap}}{\chi n_t n_l} \left(\frac{w_s}{l_s}\right)^3 z \qquad (1)$$

where V is voltage in volts and z is displacement in microns; $n_s$ is the number of serpentine springs per actuator; $n_l$ is the number of segments in each spring; $n_t$ is the number of teeth in each portion of the comb drive actuator; $l_s$ and $w_s$ are the lengths and width in microns of each spring segment, respectively; $t_{gap}$ is the spacing in microns between the opposing teeth in the comb drive actuator (also see FIG. 6); and $\chi$ is a parameter related to fringe field effects in the comb structure of the actuator.

In one embodiment, switch 400 may use mirror 202 that is about 100 microns long.

Therefore, for the switch to function, actuator 406 and springs 404 need to be capable of providing an approximately 100-micron mirror displacement. For one implementation of switch 400, one may choose the following representative parameters: $n_s$=4; $n_l$=5; $n_t$=14; $l_s$=140 μm; $w_s$=1 μm; $t_{gap}$=2 μm; and $\chi$=4. Using Equation (1), one then finds that a displacement of 100 microns is generated with a voltage of about 125 volts.

In one embodiment, switch 400 may be fabricated using three layers of material, e.g., overlayer 204, insulating layer 208, and substrate layer 206, each layer having a representative thickness of 3, 1, and 750 microns, respectively. In other embodiments, a different thickness for each layer may be used. In one embodiment, layers 204 and 206 may comprise silicon and layer 208 may comprise silicon oxide. Layers 204, 206, and 208 may also be part of a single SOI wafer. Substrate layer 214 may be part of a different SOI wafer.

Different techniques may be used to fabricate switch 400 from an initial SOI wafer. For example, an etch fabrication method may be used. It is known that silicon etches significantly faster than silicon oxide using, e.g., reactive ion etching (RIE). Similarly, silicon oxide etches significantly faster than silicon using, e.g., fluorine-based etchants. Relatively deep cavities in a relatively thick substrate layer (e.g., layer 206) may be defined using a standard, anisotropic etching technique, such as deep RIE. Deep RIE stops automatically at the oxide layer (e.g., layer 208) acting as an etch stop. Various parts of switch 400 may be mapped onto the corresponding layer using lithography. Modern lithographic techniques are capable of defining details whose size is as small as about 0.25 microns. Additional description of various etching steps may be found, for example, in above cited U.S. Pat. No. 6,201,631 as well as in U.S. Pat. Nos. 5,629,790 and 5,501,893, the teachings of both of which are incorporated herein by reference.

Figure 7B:
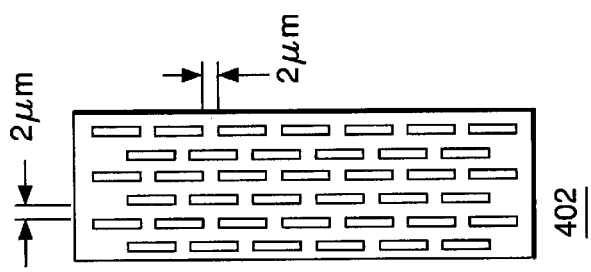
FIGS. 7A–B show representative honeycomb well patterns that may be formed in the shutter switch of FIG. 4 according to certain embodiments of the present invention.
Figure 7A:
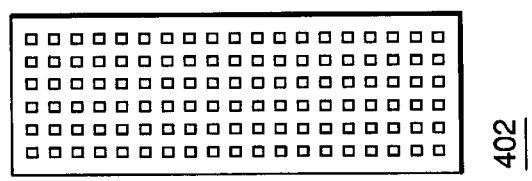

FIGS. 7A–B show top views of two representative honeycomb well patterns that may be formed in shaft 402 according to certain embodiments of the present invention. Such patterns may be used, for example, to detach shaft 402 formed in overlayer 204 from substrate layer 206 to which the shaft may be initially attached, e.g. via layer 208 in the SOI wafer. In one embodiment, a plurality of wells corresponding to a particular honeycomb pattern are etched in shaft 402 using, for example, RIE. The RIE process stops at the silicon oxide of layer 208 when the wells protrude through shaft 402 and reach layer 208. Then, a fluorine-based etchant is poured into the wells to free the shaft. It is known that fluorine-based etchants confined within a relatively thin oxide layer may laterally remove the oxide within about 1 micron of well circumference thus undercutting the adjacent silicon layers. Therefore, by appropriately spacing the wells in the shaft the underlying silicon oxide layer may be substantially removed by the etchant. As a result, the shaft detaches from the substrate and becomes capable of in-plane motion. In one embodiment, the wells may be advantageously spaced by about 2 microns as, e.g., shown in FIG. 7B. In other embodiments, different spacing and/or well patterns may be used.

Figure 8:
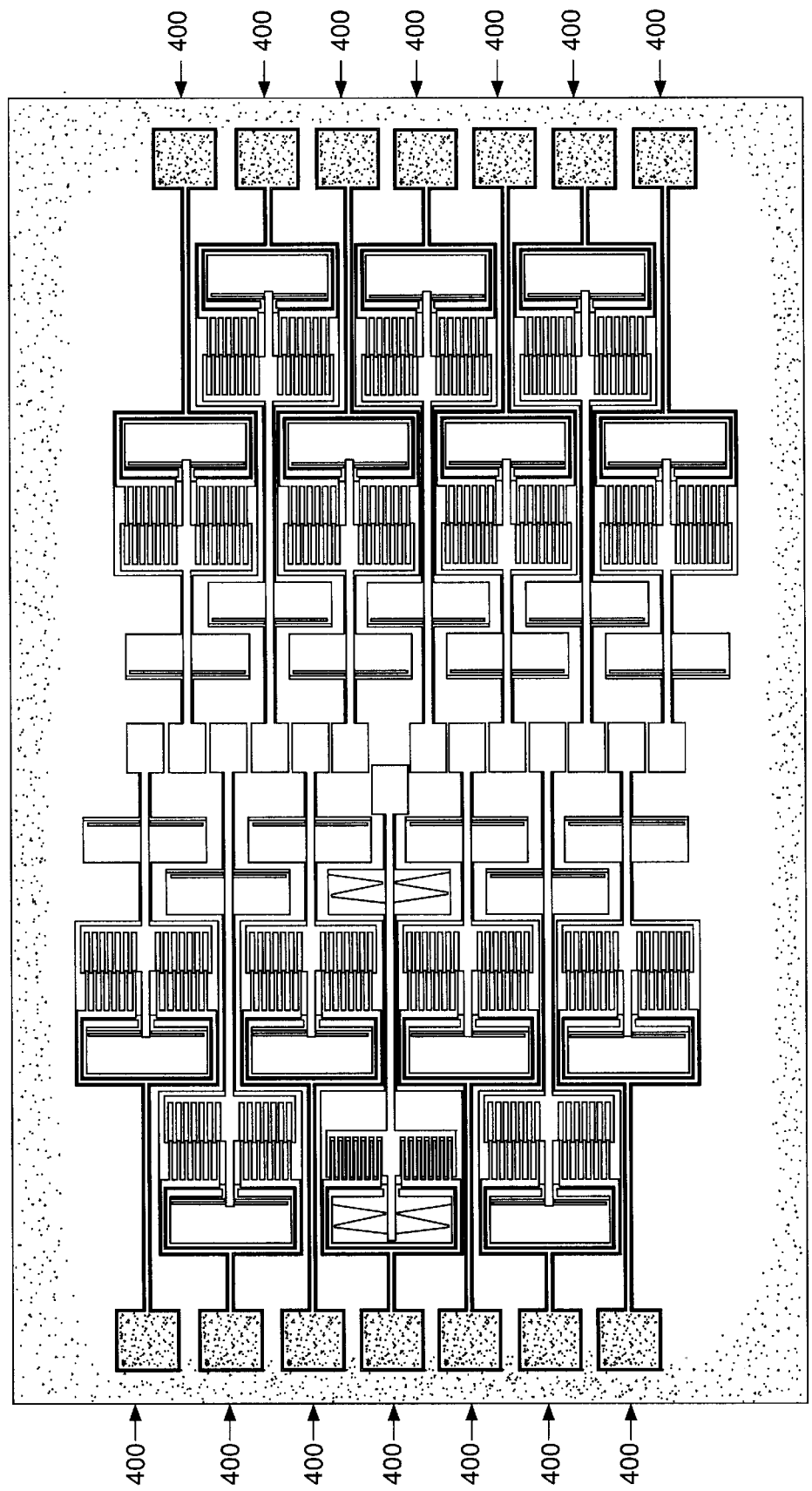
FIG. 8 shows an arrayed shutter switch according to one embodiment of the present invention.

FIG. 8 shows an arrayed switch 800 according to one embodiment of the present invention. Switch 800 comprises fourteen shutter switches 400. The shutter switch marked 400' in FIG. 8 is shown in a biased state (i.e., when driving voltage is applied between two portions of its comb drive actuator) whereas the remaining shutter switches are shown in an unbiased state. Each shutter switch 400 of arrayed switch 800 may be individually actuated using a corresponding driving voltage applied to its comb drive actuator. In different embodiments, a different number of shutter switches 400 may be similarly arrayed.

Although fabrication of shutter switches of the present invention has been described in the context of using silicon/silicon oxide SOI wafers, other suitable materials such as, for example, germanium-compensated silicon, may similarly be used. The materials may be appropriately doped as known in the art. Various surfaces may be modified, e.g., by metal deposition for enhanced reflectivity and/or electrical conductivity or by ion implantation for enhanced mechanical strength. Alternatively, the mirror may be covered with a layer of light absorbing material, in which case the shutter switch may be configured as a blocker. Also, instead of a flat reflecting surface a curved or otherwise profiled surface may be used. In addition, differently shaped drive actuators, springs, and/or mirror support structures may be implemented without departing from the scope and principle of the present invention. One or more springs may be configured between different parts of a movable structure (e.g., comprising a mirror, a shaft, and a mobile portion of an actuator) and a stationary structure (e.g., comprising different layers of the SOI wafer) of a switch. Two or more drive actuators per mirror may be used, for example, to implement a pull/push arrangement for the in-plane mirror translation.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A shutter switch, comprising:
   (A) a stationary part, comprising:
      (1) a substrate; and
      (2) an immobile portion of an actuator rigidly connected to the substrate;
   (B) a movable part supported on the substrate and comprising:
      (1) a plate;
      (2) a shaft rigidly connected to the plate; and
      (3) a mobile portion of the actuator rigidly connected to the shaft; and
   (C) one or more springs, each connected between the stationary part and the movable part, wherein:
   the actuator is configured to move the movable part relative to the stationary part in response to an electrical signal such that motion of the movable part generates plate motion parallel to the plane of the substrate; and
   the mobile and immobile portions of the actuator, the plate, and the shaft are formed in a single layer of a wafer.

2. The invention of claim 1, wherein the switch is formed in the wafer, the wafer comprising at least three layers, wherein:
   a first layer comprises the substrate;
   a second layer is formed over the first layer; and
   a third layer is formed over the second layer, wherein:
      the second layer electrically insulates the first layer from the third layer; and
      the mobile and immobile portions of the actuator, the plate, and the shaft are formed in the third layer.

3. The invention of claim 2, wherein the first and third layers comprise semiconductor material and the second layer comprises an oxidized semiconductor material.

4. The invention of claim 2, wherein the shaft comprises a plurality of wells patterned to detach the shaft from the second layer using etching.

5. The invention of claim 1, wherein the portions of the actuator are electrically isolated from each other.

6. The invention of claim 5, wherein the mobile portion moves toward the immobile portion in response to a voltage applied between said portions.

7. The invention of claim 5, wherein the portions are comb-shaped.

8. The invention of claim 1, wherein:
   the wafer comprises a cavity beneath the plate, when the plate rests in a terminal position;
   the plate has two reflective surfaces; and
   the shutter switch is configured as an add/drop element.

9. The invention of claim 1, wherein the plate is covered by a layer of light absorbing material and the shutter switch is configured as a blocker.

10. The invention of claim 1, wherein the shutter switch further comprises:

a second substrate attached to the stationary part; and
a tilted reflector attached to the second substrate and positioned beneath the plate when the plate rests in a terminal position, wherein the plate has a reflective surface and the shutter switch is configured as a 1×2 switch.

11. The invention of claim 1, wherein the shutter switch is implemented in an integrated device having two or more shutter switches.

12. The invention of claim 1, wherein the stationary part comprises a cavity to accommodate spring expansion during the plate translation.

13. The invention of claim 1, wherein the one or more springs comprise four serpentine springs, wherein two serpentine springs are attached between the stationary part and an end of the shaft and two serpentine springs are attached between the stationary part and a middle section of the shaft.

14. A method of fabricating a movable structure supported on a substrate in an integrated device, comprising the steps of:
   (a) forming on a first layer, which is a substrate of a wafer, second and third layers, wherein said third layer is on top of said second layer, which is on top of said first layer;
   (b) performing a first etch to form one or more openings in the third layer to expose portions of the second layer; and
   (c) performing a second etch to remove material from the second layer to detach the movable structure from the first and second layers, wherein:
      the movable structure is formed in the third layer and configured to move parallel to the plane of the wafer; and
      the step of performing the first etch comprises the step of forming a pattern of openings in a portion of the third layer corresponding to the movable structure, which pattern facilitates the detachment of the movable structure from underlying portions of the second and first layers during the second etch.

15. The method of claim 14, wherein:
   the wafer is a silicon-on-insulator (SOI) wafer;
   the first and third layers comprise silicon; and
   the second layer comprises a silicon oxide.

16. The method of claim 14, further comprising the step of forming a plurality of separate movable structures supported on the substrate.

17. The method of claim 14, wherein the step of performing the second etch comprises the step of laterally removing material from the second layer using the pattern of openings to undercut the portion of the third layer corresponding to the movable structure.

18. A shutter switch, comprising:
   (A) a substrate;
   (B) means for supporting a plate by the substrate; and
   (C) means for moving the plate parallel to the plane of the substrate in response to an electrical signal applied to said means for moving, wherein:
   the means for supporting comprises:
      (1) a shaft rigidly connected to the plate; and
      (2) one or more springs, each configured between the shaft and the substrate; the means for moving comprises an actuator, which comprises:
         (1) an immobile portion rigidly connected to the substrate; and
         (2) a mobile portion rigidly connected to the means for supporting, wherein the mobile portion moves toward the immobile portion in response to a voltage applied between said portions to generate plate motion; and the mobile and immobile portions of the actuator, the plate, and the shaft are formed in a single layer of a wafer.

19. A shutter switch, comprising:

(A) a stationary part, comprising:
  (1) a substrate; and
  (2) an immobile portion of an actuator rigidly connected to the substrate;

(B) a movable part supported on the substrate and comprising:
  (1) a plate;
  (2) a shaft rigidly connected to the plate; and
  (3) a mobile portion of the actuator rigidly connected to the shaft; and (C) one or more springs, each connected between the stationary part and the movable part, wherein:

the actuator is configured to move the movable part relative to the stationary part in response to an electrical signal such that motion of the movable part generates plate motion parallel to the plane of the substrate;

the switch is formed in a wafer, the wafer comprising at least three layers, wherein:
  a first layer comprises the substrate;
  a second layer is formed over the first layer; and
  a third layer is formed over the second layer, wherein:
    the second layer electrically insulates the first layer from the third layer; and
    the mobile and immobile portions of the actuator, the plate, and the shaft are formed in the third layer; and the shaft comprises a plurality of wells patterned to detach the shaft from the second layer using etching.

20. A shutter switch, comprising:

(A) a stationary part, comprising:
  (1) a substrate; and
  (2) an immobile portion of an actuator rigidly connected to the substrate;

(B) a movable part supported on the substrate and comprising:
  (1) a plate;
  (2) a shaft rigidly connected to the plate; and
  (3) a mobile portion of the actuator rigidly connected to the shaft;

(C) one or more springs, each connected between the stationary part and the movable part, wherein:

the actuator is configured to move the movable part relative to the stationary part in response to an electrical signal such that motion of the movable part generates plate motion parallel to the plane of the substrate;

(D) a second substrate attached to the stationary part; and (E) a tilted reflector attached to the second substrate and positioned beneath the plate when the plate rests in a terminal position, wherein the plate has a reflective surface and the shutter switch is configured as a 1×2 switch.

21. A shutter switch, comprising:

(A) a stationary part, comprising:
  (1) a substrate; and
  (2) an immobile portion of an actuator rigidly connected to the substrate;

(B) a movable part supported on the substrate and comprising:
  (1) a plate;
  (2) a shaft rigidly connected to the plate; and
  (3) a mobile portion of the actuator rigidly connected to the shaft; and (C) one or more springs, each connected between the stationary part and the movable part, wherein:

the actuator is configured to move the movable part relative to the stationary part in response to an electrical signal such that motion of the movable part generates plate motion parallel to the plane of the substrate; and the one or more springs comprise four serpentine springs, wherein two serpentine springs are attached between the stationary part and an end of the shaft and two serpentine springs are attached between the stationary part and a middle section of the shaft.

* * * * *